United States Patent [19]

Sasaki

[11] 4,269,213

[45] May 26, 1981

[54] SAFETY VALVE

[75] Inventor: Michiaki Sasaki, Yokohama, Japan

[73] Assignee: Nissan Motor Company, Limited, Yokohama, Japan

[21] Appl. No.: 46,096

[22] Filed: Jun. 6, 1979

[30] Foreign Application Priority Data

Aug. 8, 1978 [JP] Japan .................. 53-113051[U]

[51] Int. Cl.³ ............................................. F16K 17/36
[52] U.S. Cl. .................................................... 137/38
[58] Field of Search .................. 137/38, 39; 180/282, 180/284

[56] References Cited

U.S. PATENT DOCUMENTS

| 3,910,301 | 10/1975 | Kuss | 137/38 |
| 3,915,255 | 10/1975 | Springer | 137/38 X |
| 3,957,072 | 5/1976 | Ellsworth | 137/38 |
| 3,972,340 | 8/1976 | Miller | 137/38 |
| 4,005,724 | 2/1977 | Courtot | 137/38 |

Primary Examiner—Robert G. Nilson
Attorney, Agent, or Firm—Thompson, Birch, Gauthier & Samuels

[57] ABSTRACT

A safety valve which interrupts fluid flow when it is substantially tilted or inverted, comprises a valve chamber with three lobes two of which have an inlet and an outlet opening at an inlet and an outlet valve seat, respectively. A ball is freely movable within the chamber. When the chamber is in its normal position, or preferred orientation, the ball rests or floats in the third lobe, but when the chamber is tilted or inverted, the ball moves into one of the other lobes and abuts against the inlet or the outlet valve seat.

6 Claims, 11 Drawing Figures

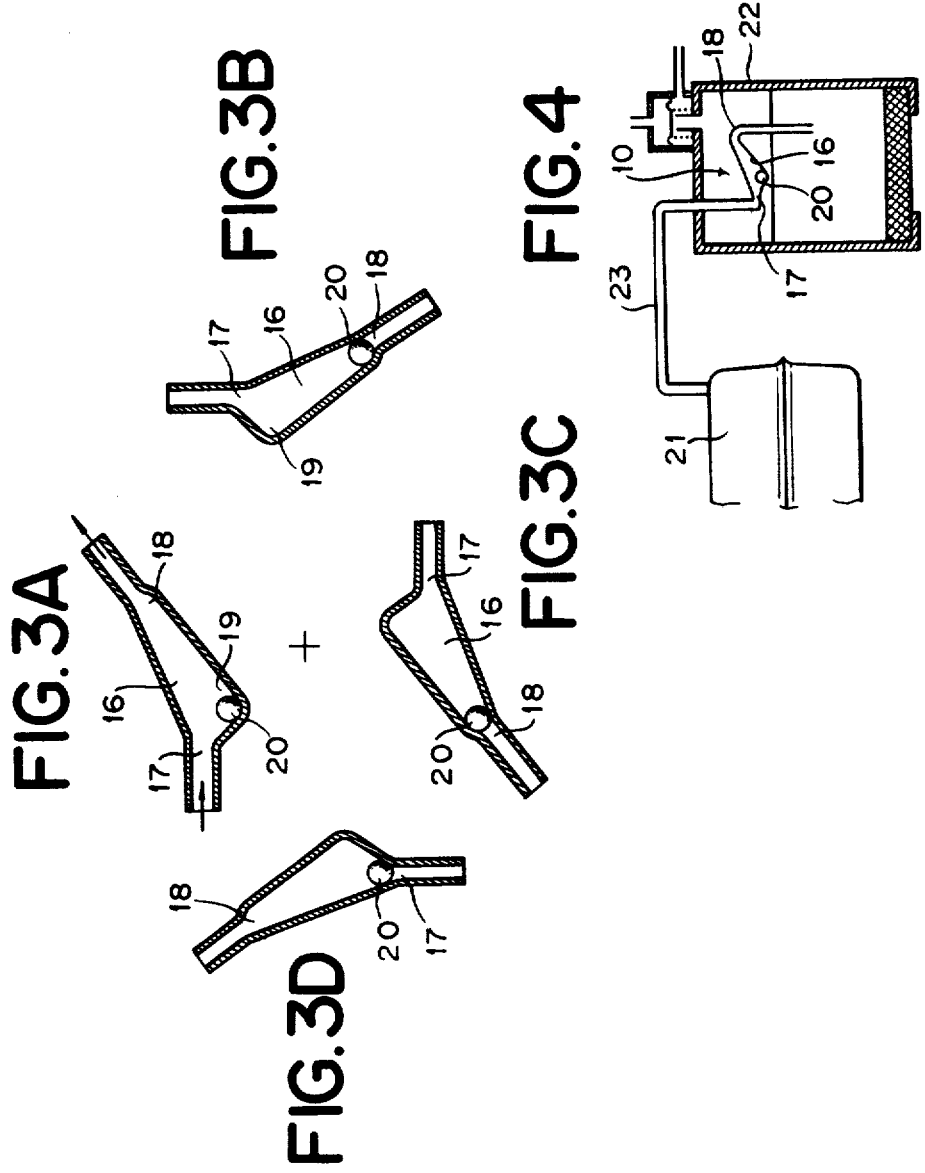

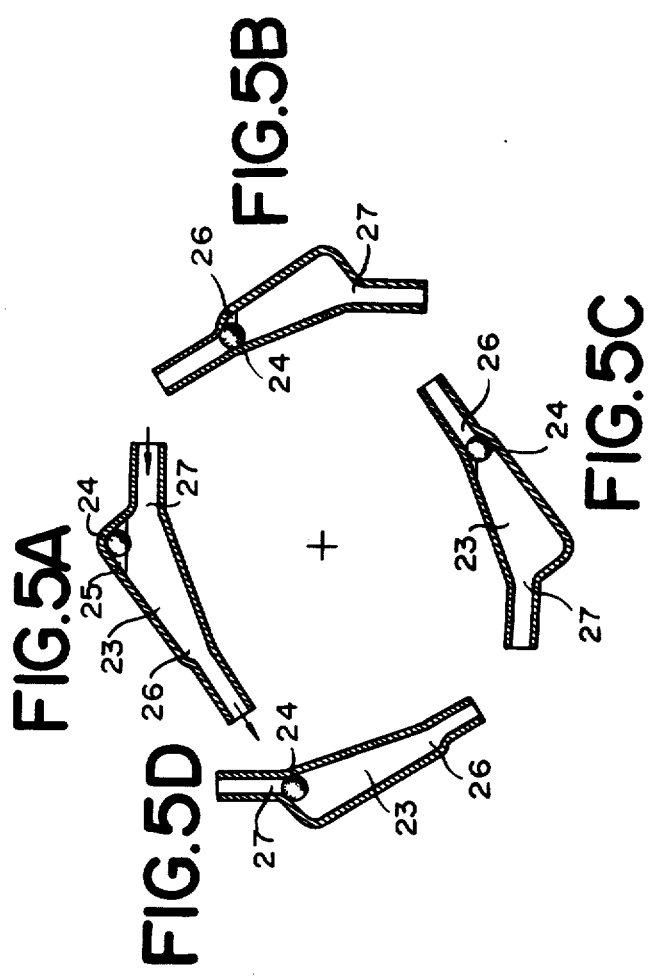

SAFETY VALVE

BACKGROUND OF THE INVENTION

The invention relates to an apparatus for preventing an outflow of fluid from an outlet passage of a liquid vessel when a construction incorporating the vessel is substantially tilted or overturned.

An apparatus of this kind is usually provided to a fuel tank of an automobile or motorcycle, or to a fuel oil tank of an oil burner or the like, in order to prevent a dangerous fire which might occur as a result of outflow of the fuel from the tank, when the automobile, motorcycle, or burner has been tilted onto its side or overturned. A variety of such apparatuses have been proposed in the prior art, but there has been available no apparatus which operates reliably, which simple in construction and which has a reduced number of parts to enable its manufacture at a reduced cost.

SUMMARY OF THE INVENTION

Therefore, it is the object of the present invention to provide an apparatus for preventing an outflow of fluid from a liquid vessel upon tilting or inversion which is simple in construction, inexpensive, and compact.

In accordance with the present invention, this object is attained by an apparatus which interrupts fluid flow therethrough when it is tilted beyond a certain angle from its normal position or preferred orientation, or inverted, comprising: (a) a valve chamber having an inlet opening, an outlet opening and a recess located in the inside surface of the chamber intermediate the inlet opening and the outlet opening; and (b) a ball within the valve chamber which can move freely therein and into and out of the recess; wherein the inlet opening and the outlet opening are of smaller diameter than the ball; and wherein the shape of the chamber guides and allows the ball to move by the action of gravity or buoyancy up against one or the other of the inlet and outlet openings and to close it, when the chamber is substantially tilted by more than a certain amount from the normal position or preferred orientation; and wherein, when the chamber is tilted by less than a certain amount from the normal position or preferred orientation, the ball is urged into the recess.

BRIEF DESCRIPTION OF THE DRAWING

The present invention will become more fully understood from the following description of a preferred embodiment and modifications thereof, and from the appended drawings, in which:

FIGS. 3A, 3B, 3C and 3D illustrate the operation of the apparatus of FIG. 2;

FIG. 4 illustrates one application of the apparatus of FIG. 2; and

FIGS. 5A–5D are views similar to FIGS. 3A–3D showing a modification of the present invention.

DESCRIPTION OF THE PREFERRED EMBODIMENTS

Before proceeding with the description of the present invention, one form of the conventional apparatus will be described for a better understanding of the present invention.

Figure 1:
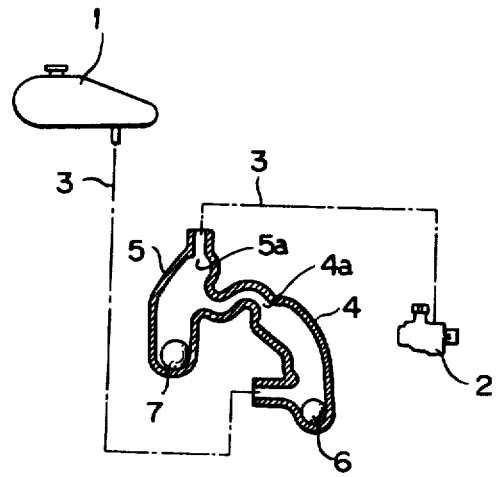
FIG. 1 is a schematic cross-section of a conventional or prior-art apparatus disposed in a fuel passage.

Referring to FIG. 1, there is shown a conventional apparatus which is disposed in a fuel passage 3 which supplies fuel from a fuel tank 1 to a carburetor 2 of a motorcycle. This apparatus comprises a pair of valve chambers 4 and 5 which are arranged at an angle to one another and which are connected in series so as to provide a fuel passage, and which contain balls 6 and 7, respectively. When the vehicle is in the upright position so that gravity acts in the downward direction in the drawing, the balls are positioned out of the flow path of the fuel, but when the motorcycle is inclined onto its side, or is inverted, they move by the action of gravity so as to abut against the respective outlet openings 4a and/or 5a of the chambers, so as to interrupt the communication between these chambers and the remainder of the fuel passage and to cut off the flow of fuel to the carburetor. With this construction, safe cutoff of the flow of fuel, when the motorcycle is inclined or inverted, is positively assured. However, the fact that this construction requires the provision of two valve chambers and two ball valve members, and also a communicating means between these chambers, means high cost and a larger size than might be desired. Further, involved manufacturing processes are required.

Figure 2:
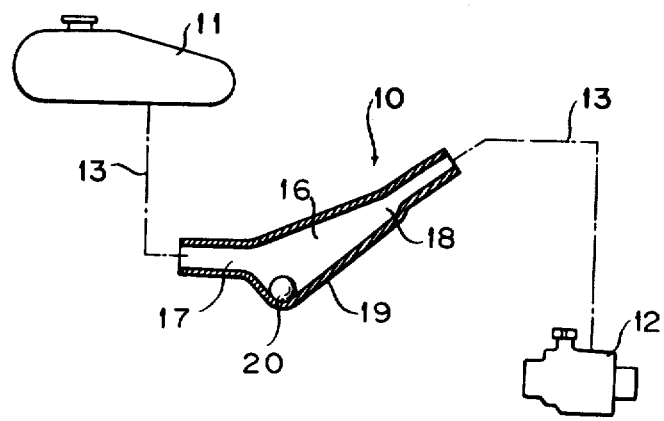
FIG. 2 is a schematic cross-section of a preferred embodiment of the present invention disposed in a fuel passage.

Referring to FIG. 2, there is shown a preferred embodiment 10 of the present invention. This apparatus 10 is disposed in a fuel passage 13 which connects the fuel tank 11 to the carburetor 12 of a motorcycle. The apparatus 10 comprises a valve chamber 16, which is formed so as to have substantially the form of a triangle in cross-section and an adequate depth in the direction perpendicular to the plane of the cross section, i.e. the plane of FIG. 2. The exact shape of the valve chamber 16, however, is not critical. The apparatus 10 further comprises an inlet opening 17 on the left side of the chamber 16 in FIG. 2, and an outlet opening 18 on the right side of the chamber 16 in FIG. 2: in other words, the inlet opening and the outlet opening may be said to be located at two apices, respectively, of the triangle. The chamber 16 is also formed with a recess 19 which is situated at the third apex of the triangle intermediate the openings 17 and 18. Thus the recess 19 is joined to both the openings 17 and 18 by smooth continuous surfaces. When the apparatus 10 is in its normal position, or preferred orientation, wherein gravity acts in the downward direction as seen in the drawing, the recess 19 is the lowermost portion of the chamber 16. The openings 17 and 18 are circular, and constitute valve seats.

A ball valve member 20 is freely movable within the chamber 16. This ball 20 has a diameter which is greater than the diameter of either of the openings 17 or 18, and, in this embodiment, has a specific gravity which is higher than that of the fluid being used, which is gasoline. The shape of the chamber 16 is such that it is possible for the ball 20 to move up against and to abut the one or the other of the openings 17 or 18, when the apparatus is tilted away from its preferred orientation, or normal position, through more than a certain angle. The smooth shape of the walls of the chamber 16 guides the ball along them towards these openings. Since there is no other recess or lobe in the chamber 16, the ball cannot become stuck therein, but must be located, by the action of gravity, either against the opening 17, or against the opening 18.

FIGS. 3A–3D are illustrations of the operation of the apparatus shown in FIG. 2. In the normal position, or preferred orientation, of the motorcycle, as in FIG. 3A, flow of the fuel through the valve chamber 16 is possible, as indicated by arrows. However, when the motorcycle has overturned through more than a certain angle in the clockwise direction, for instance 90°, as in FIG. 3B, the chamber 16 overturns through the same angle whereby the ball 20 runs down against the opening 18, out of the recess 19, by the action of gravity, and thereby cuts off the flow of fuel and prevents continued outflow of fuel from the carburetor of the motorcycle, even through a certain amount of fuel will inevitably escape from the chamber during the initial phase of valving. Thus a fire may well be prevented.

Similarly, if the motorcycle is completely inverted, as seen in FIG. 3C, the fuel supply to the carburetor is cut off.

If the motorcycle has been turned through, for example, 90° in the counterclockwise direction, as seen in FIG. 3D, the ball 20 moves under the action of gravity so as to abut against and block the opening 17. Again, the form of the chamber 16 guides the ball up against this opening.

FIG. 4 illustrates one application of this apparatus 10. Here it is disposed within a canister 22, which is connected via a fume passage 23 with the fuel tank 21 of an automobile in which evaporated hydrocarbon is produced.

Normally, evaporated hydrocarbon fuel passes through the valve chamber 16 from the inlet opening 17 to the outlet opening 18 and is absorbed within the canister 22. However, when the automobile has turned onto its side, or upside down, the ball valve member 20 blocks either the inlet opening 17 or the outlet opening 18, thus preventing fuel from the tank flowing into the canister 22 and thence to the outside.

In the embodiment described above, the ball 20 was made so as to have a specific gravity substantially higher than that of the fluid with which the apparatus was to be used, which was gasoline. However, also in accordance with the present invention, it is possible to use a ball which is formed so as to have a substantially lower specific gravity than the fluid.

FIGS. 5A–5D show the operation of such a modification. The valve chamber 23 of this modification is normally disposed in the inverted position, as compared with the position of the first-described embodiment; that is, the recess 25, which corresponds to the recess 19 of the first-described embodiment, is uppermost, instead of lowermost as was the recess 19. Thus, in the normal position, or preferred orientation, as seen in FIG. 5A, the ball 24 floats in this recess 25, on top of the fluid. However, when the vehicle incorporating this apparatus overturns, the ball 24, floating on the fluid, finds its way to abut against either the outlet opening 26, as in FIGS. 5B and 5C, or against the inlet opening 27, depending on the direction and the degree of overturning. The outflow of fuel is therefore prevented, in the same manner as before. Because it is essential that the valve chamber should be filled with the fluid in this modification, this floating-ball modification is limited in applicability.

Although the present invention has been shown and described with respect to some preferred embodiments thereof, it should be understood that various modifications of the form and the details thereof may be made by those skilled in the art, without departing from the scope of the present invention. For example, the shape of the valve chamber is not to be limited to the triangular cross-section and adequate depth form shown, but may vary quite widely. It may have three lobes, one containing the inlet valve seat, and another containing the outlet valve seat, the third receiving the ball when the chamber is in its normal position, or preferred orientation. The valve chamber may take substantially the form of two joined frusta of cones which are joined together at their thicker ends so that they have an inlet and an outlet opening at their smaller ends, respectively. Furthermore, the valve chamber may be polygonal in cross-section or may be formed by other curved surfaces. That is, the form can vary, provided that the function described is assured. Nor should the use of the present invention to be limited by the uses shown of the embodiments; for example, the present invention could be used to protect against escape of gas, as well as liquid. Further, although the present invention has been described with reference to the drawings, these have been given for the purposes of illustration only, and are not to be taken as in any way limiting the scope of the present invention. For example, it is not essential that one of the lobes leading to a valve seat should be longer than the other, although it happens to be so in the illustrated embodiments. Nor should any other features of the purely exemplary embodiments and drawings be taken as restricting the scope of the present invention, or of the protection sought to be granted by Letters Patent, which is to be defined solely by the appended claims.

What is claimed is:

1. An apparatus for interrupting fluid flow therethrough when tilted a predetermined amount from a normal position, said apparatus comprising:
   (a) a housing having a valve chamber with a substantially triangular cross section, said housing having an inlet, an outlet and a recess positioned at the respective apexes of said chamber; and
   (b) a ball positioned within said chamber and freely movable therein,
wherein said ball remains located essentially within said chamber recess when said apparatus is in its normal position, and wherein said ball relocates against said inlet to block further fluid flow therethrough when said apparatus is tilted a predetermined amount in one direction from the normal position, and wherein said ball relocates against said outlet to block further fluid flow therethrough when said apparatus is tilted a predetermined amount in another direction from the normal position.

2. An apparatus according to claim 1 wherein said chamber has an adequate depth in the direction perpendicular to the plane of the cross-section.

3. An apparatus according to claim 1 or 2 wherein said inlet opening and said outlet opening are formed as circular valve seats.

4. An apparatus according to claim 1 wherein said chamber takes substantially the form of two joined frustra of cones which are joined together at their thicker ends, said inlet opening and said outlet opening being formed at the smaller ends, respectively, of said two joined frustra of cones.

5. An apparatus according to claim 1 wherein said ball is formed as having a substantially greater specific gravity than gasoline.

6. An apparatus according to claim 1 wherein said ball is formed as having a substantially lower specific gravity than gasoline.

* * * * *